United States Patent Office 3,375,701
Patented Apr. 2, 1968

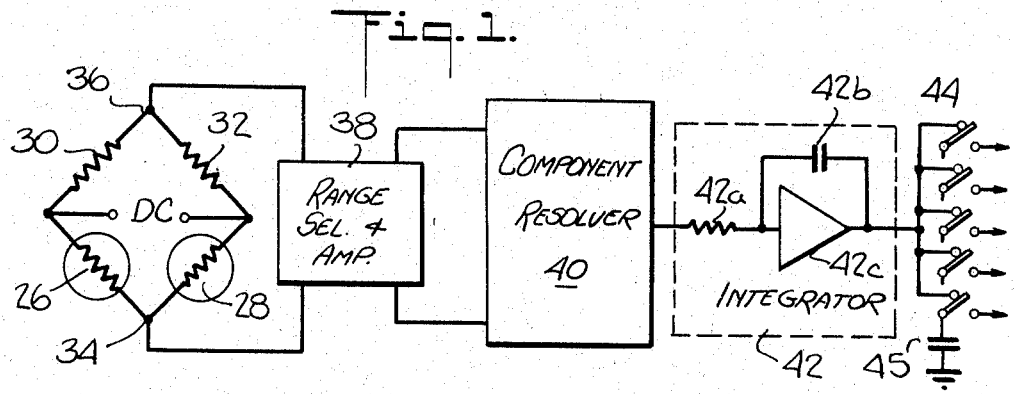
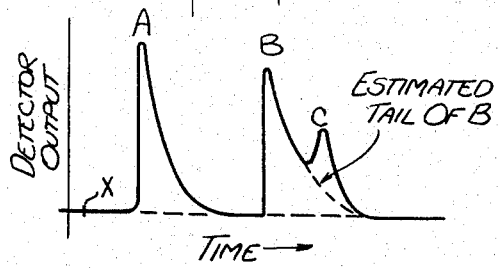
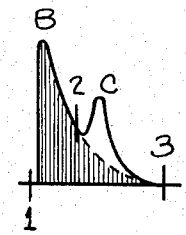
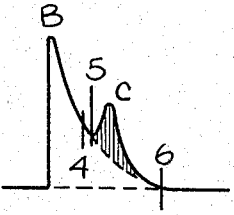
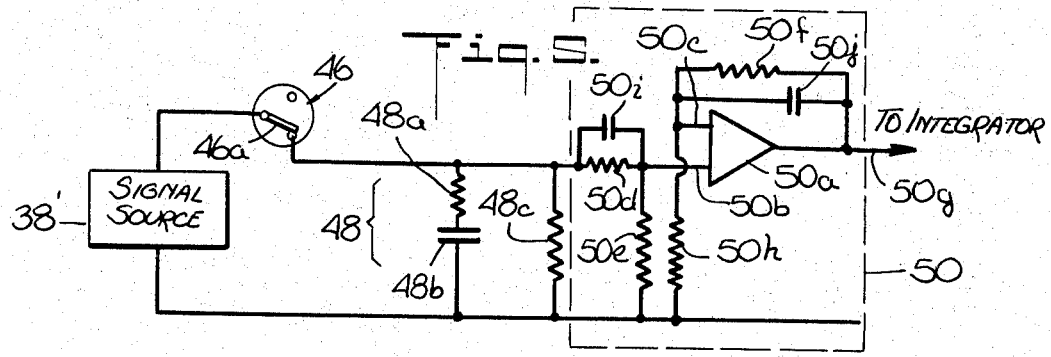
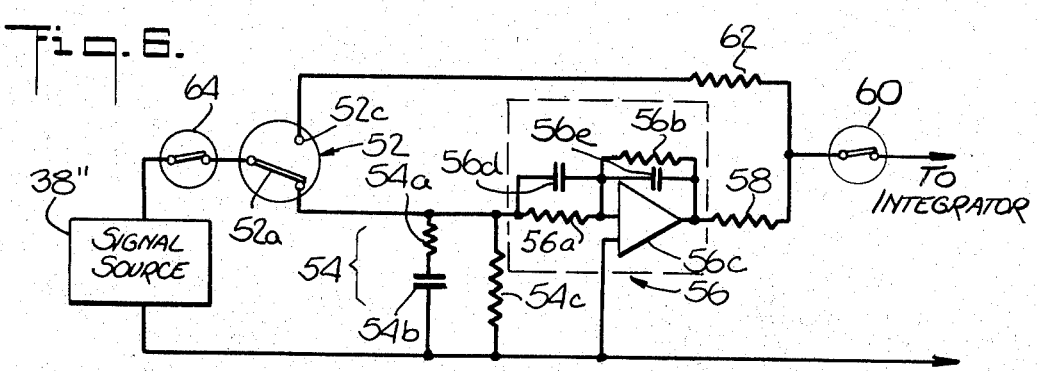

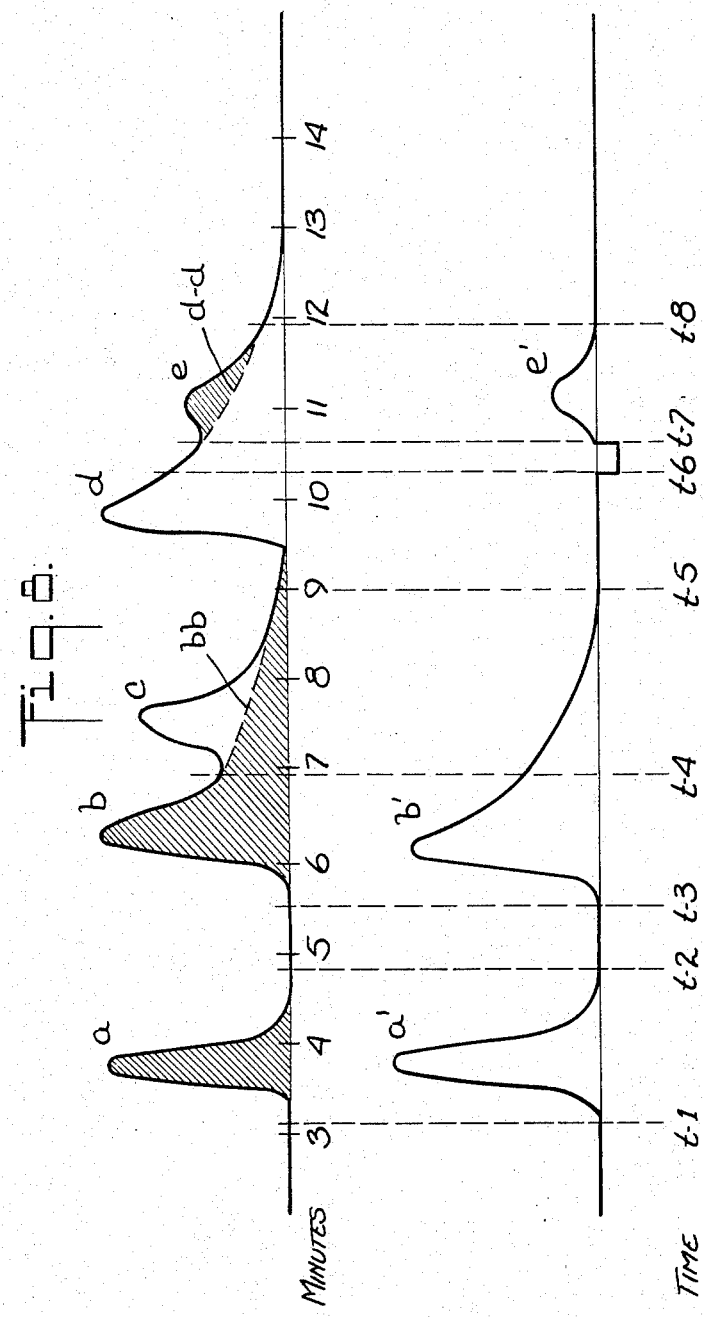

3,375,701
METHODS AND APPARATUS FOR INTERPRETING OVERLAPPING SIGNALS
Graydon Wells Arksey, Edmonton, Alberta, Canada, assignor to Chemcell (1963) Ltd., West Montreal, Quebec, Canada, a corporation of Canada
Filed Dec. 24, 1964, Ser. No. 421,046
28 Claims. (Cl. 73—23.1)

The present invention relates to methods and apparatus for interpreting composite signals of a form provided by gas chromatographs, in which constituents of a sample being analyzed are often represented by close-spaced signals. If either constituent were absent, the gas chromatograph would yield a peaked signal with a following tail. Where both constituents are present and the resulting signals occur in close sequence in the chromatograph output, the tail of the first signal is obscured by the second signal.

There are two main methods of interpreting the signal output, in obtaining a quantitative indication of each constituent in the sample. As to any one constituent, the relative heights of the signal peaks can be used, or the integral of the function of signal-height versus time can be used. The latter is more accurate. Heretofore the occurrence of overlapping signals representing different constituents has posed a problem in the use of the signal-integration method. Graphical methods of interpretation of recorded chromatograph signals can be analyzed, by manually using a planimeter to integrate an approximation of the signal that represents each constituent; but this approach is tedious and, furthermore, it is not suitable where the output of the gas chromatograph is to be available quickly and directly in automatic process control systems.

The foregoing problem is of particular importance in the use of gas chromatographs, and for this reason the present invention is discussed in that connection. However, other instruments are known having corresponding output signals needing interpretation, so that mention of gas chromatographs is not intended as limiting except as required in context.

An object of the present invention resides in the provision of novel methods and apparatus for deriving a desired signal representing either one of a pair of overlapping peaked signals that constitute a "composite signal" in which the tail of the first signal overlaps the second signal. In one case the desired signal is the first signal alone, which is the remainder after the second signal has been stripped from the composite signal, while in the other case the desired signal is second signal alone, which is the remainder after the first has been stripped from the composite signal.

A further object of the invention resides in methods and apparatus for deriving an integrated representation of the signal-versus-time variation of a peaked signal having a tail that occurs in a composite signal including two such signals that are close-spaced and in which the second signal overlaps the tail of the first.

A specific object of this invention is to provide novel methods and apparatus for converting the output of a gas chromatograph directly into quantitative representations of a sample being analyzed, in a manner suitable for automatic execution and for use in automatic process control despite the occurrence of successive overlapping signals.

A feature of the invention involves the generation of a signal that simulates the tail that normally follows a signal peak, and the use of such tail-simulating signal in combination with portions of the composite signal to derive signals that represent individual consttuents. In the detailed description below, it is shown that a gas chromatograph can be constructed utilizing the foregoing feature of peak separation where overlapping signals occur, and utilizing the separate signals where there is no overlap problem, in a manner well suited to automatic process control. The peak-area of each signal that represents a separate constituent of the sample is integrated. The integrated output is used to charge a large capacitor. There are a number of memory circuits corresponding, respectively, to the number of constituents in the sample that are to be monitored. Each memory unit has a small storage capacitor. Upon completion of each peak-area integration, the large capacitor at the output of the integrator is switched to a selected one of the memory capacitors, and brings the charge potential of the latter to the potential reached in the integration. The memory capacitor retains its charge. The large capacitor is switched back to the integrator, and these are then set to zero in readings for the next peak-area determination.

The foregoing demonstrates a still further feature of the invention, namely, the provision of novel apparatus that is well suited to automatic process control in dependence on the peak-areas of the signal peaks in the output of a gas chromatograph. Accordingly, a further object of the invention resides in the provision of a gas chromatograph having novel means for providing output control on the basis peak-area integration of signals representing different sample constituents, and in an economical and highly effective manner.

The nature of the invention in its various aspects, together with its further objects and novel features will be understood more fully from the following description of various embodiments in which reference is made to the accompanying drawings. In the drawings:

FIGURE 1 is a diagram representing a measurement system involving broad aspects of the invention;

FIGURE 2 is a curve representing typical signal forms in the output of a gas chromatograph;

FIGURES 3 and 4 are curves of overlapping signals and including a shaded area representing the signal to be separated from the composite signal;

FIGURE 5 is the diagram of a circuit for separately deriving the shaded signal in FIG. 3 in accordance with one aspect of the invention;

FIGURE 6 is the diagram of a circuit for separately deriving the shaded signal in FIG. 4;

Figure 7:
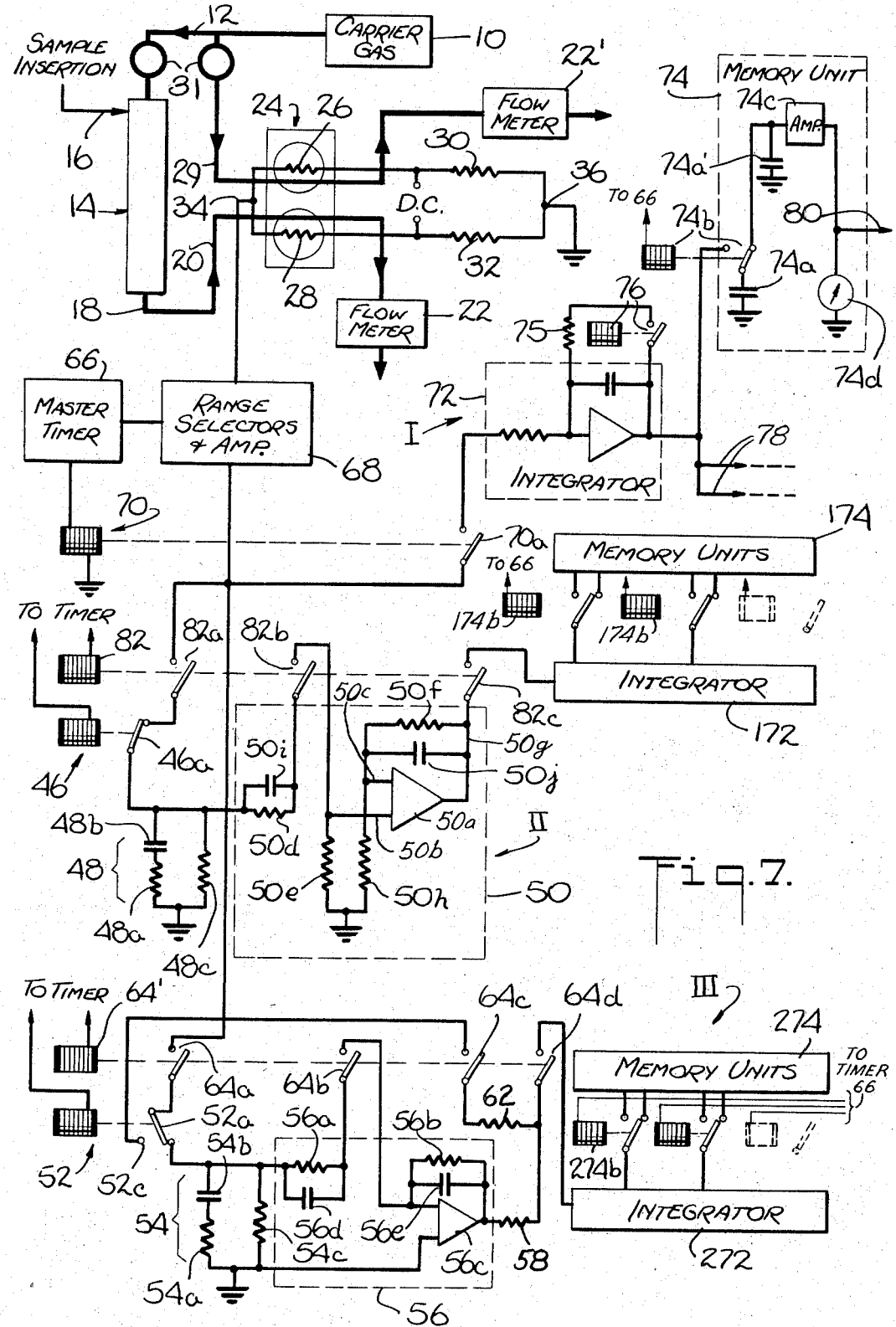

FIGURE 7 is a diagram of a gas chromatograph and a circuit, including the circuits of FIGS. 5 and 6, as an embodiment of the various features of the invention; and FIGURE 8 represents two typical curves, the first curve representing the output of a gas chromatograph in which the areas of desired signals overlapped by other signals are represented by shade lines, and the second curve representing the response of the apparatus in FIG. 7 to the signal represented by the first curve.

Referring now to the drawings, a gas chromatograph is illustrated at the top of FIG. 7. A source 10 of carrier gas or eluent is connected by a tube 12 to the inlet end of a separating column 14. Provision is made at the inlet end 16 of the column to inject a measured sample to be analyzed. The sample is carried along the column as a vapor together with the flow of carrier gas. The column provides an extensive surface that is either coated with a liquid or is of a specially chosen solid that retains the various constituents to a different extent. The separate constituents of the sample emerge successively in the effluent at the discharge end 18 of column, and flow via tube 20 through a flowmeter 22 to a receiver (not shown) or to the atmosphere. The column is maintained at a standardized constant temperature, and the carrier gas flow is held constant, so that the carrier gas mixed with individual "bands" of the constituents in the sample emerge at definite times after the moment of sample injection.

A detector 24 contains two sensing resistors 26 and 28 that are exposed to the carrier gas in line 29 and the effluent in line 20, respectively. Sensing resistors form two arms of a Wheatstone bridge that includes reference resistors 30 and 32. Using restrictors 31 and flowmeters 22, 22′, both of the sensing resistors are initially exposed equally to only the carrier gas, and the bridge is balanced. At some time after a sample has been injected, when a "band" containing a separated constituent passes sensing resistor 28, the bridge yields an output signal at terminals 34 and 36.

As shown in FIG. 2, curve A represents the bridge output plotted against time, corresponding to a single constituent in the effluent, the rise of the signal, starting at a time after the sample injection time X. The signal A representing a single constituent includes a sharp rise to a peak, followed by a steep drop and a decaying tail. A composite signal follows signal A, including peaks B and C that represent two constituents. The estimated tail of signal B is represented in FIG. 2 by a dotted line.

The heights of signals A, B and C could be measured as representations of the respective quantities of the constituents in the sample, but the integral of the signal-versus-time curve of a given constituent has been found more accurate. This can be obtained by using a planimeter on a strip recording of the curve. This method is not suitable where the signal evaluation is needed for use in automated process-control apparatus. Furthermore, there is inevitably an objectionable latitude of error involved in approximating the tail of the first of two overlapping signals such as signals B and C.

FIG. 1 is a diagram of a system for automatically integrating each separate constituent-representing signal A, and when required, to separate and integrate the parts of an overlapping pair of signals B and C. In FIG. 1, the same bridge is shown as appears in FIG. 7, including sensing resistors 26 and 28, and reference resistors 30 and 32. The output terminals 34, 36 of the bridge are connected to a range selector and amplifier unit 38, providing various amplification factors and providing isolation of the bridge from the component resolver 40. The latter contains circuits detailed below for separating dual-peak signals, when necessary, into separate components each representing a constituent of the sample being analyzed. Reconstituted signals representing separately the overlapping peaked signals are then applied to an electrical integrator; and in turn the integrator output is applied to a separate memory circuit for each constituent of the sample by means of switching devices 44 and condensers 45 upon completion of each constituent-integration operation of integrator 42. A typical integrator suitable for the purpose includes an operational amplifier having an input resistor 42a, a negative feedback capacitor 42b and a chopper-stabilized direct-current amplifier 42c that has high open-loop gain. Such an amplifier and its use as an integrator are more fully described in an article by E. A. Goldberg, "Stabilization of Wide-Band Direct Current Amplifiers for Zero and Gain" (1950), RCA Review 11 (2), pp. 296–300.

A signal resolver for separating the first signal component (the shaded area in FIG. 3) from a composite signal including a pair of peaked signals, where the tail of the first signal overlaps the second signal, is shown in FIG. 5. Signal supplying means or source 38′ (corresponding to unit 38 in FIG. 1) is connected to normally closed contacts 46a of a switching device 46, ordinarily a relay. A decay network 48 including a small current-limiting resistor 48a in series with capacitor 48b, shunted by a resistor 48c of much higher resistance, is connected by contacts 46a to signal source 38′. A non-inverting amplifier 50 is connected to signal source 38′ when contacts 46a are closed. Amplifier 50 includes an amplifying portion 50a that is of a form commonly used as a differential amplifier and has differential input terminals 50b and 50c. An isolating resistor 50d of large value is interposed between decay network 48 and one input terminal 50b, and a ground-return resistor 50e is also connected to terminal 50b. A feedback resistor 50f is connected between the output terminal 50g and input terminal 50c, and ground-return resistor 50h is also connected to terminal 50c. Resistors 50d and 50e inherently constitute a voltage divider that applies only part of the signal of decay network 48 to the amplifying portion 50a; but by like token resistors 50f and 50h constitute a voltage divider that is proportioned to compensate for the effect of divider 50d–50e and to deliver any desired level of signal at output terminal 50g. From practical considerations relating to the whole system, unity gain of amplifier 50 is preferred. Small condensers 50i and 50j are circuit refinements to maintain frequency response, to keep "noise" at a minimum and to prevent delay in tracking fast peaks.

The output of amplifier 50 is applied to an integrator such as that shown in FIG. 1. Amplifier 50 provides isolation between the delay network 48 and the integrator, so that reasonable impedance values can be used in the delay network. The non-inverting characteristic of amplifier 50 is also a practical consideration, so that the output signal polarity can be the same as that provided by other networks to integrators.

In using the circuit of FIG. 5 for deriving a signal separately representing component B in FIG. 3 despite the appearance of the composite signal B, C from source 38′, the integrator is first set at zero at point 1 in FIG. 3. This is a point in time that is known in advance, as being just prior to the rise of signal B. This time is known where a sample is being analyzed whose constituents are known or anticipated but whose proportions are to be measured, as in the case of a substance involved in a production process monitored by a gas chromatograph. Uniform, standardized conditions are used in operating the gas chromatograph, so that the time when each constituent will appear in the chromatograph output repeats, within a known time latitude.

As signal B rises to a peak and declines, amplifier 50 transmits the signal to the integrator, which is the ultimate receiver for this signal. The same signal is impressed on decay network 48.

At a time 2 in FIG. 3, just prior to the appearance of signal C, switching device 46 is operated to open contacts 46a. Thereafter amplifier 50 gets its input from decay network 48. The decay characteristic of this network is designed to match the tail of constituent B when a pure sample of that substance is checked in the gas chromatograph, as in a calibrating operation. The signal from the decay network initially matches signal B in magnitude, when contacts 46a open; and as time passes, the signal of the decay network simulates the form of the tail of signal B. Separate decay networks are proportioned to correspond to the different sample constituents to take into account the significant differences, such as their different starting times relative to the time of sample injection. (Thus in FIG. 1, various component resolvers 40 will be successively brought into effect by programmed switching.)

The output of amplifier 50 thus includes a signal derived by combining the actual start of signal B and the immediately following simulated tail of signal B. The result is quantitatively the same within a high order of accuracy, whether or not signal component C actually appears. Integration may be interrupted at point 3 in FIG. 3 by opening the circuit from amplifier 50 to the integrator, or by opening the output circuit of the integrator.

The tail slope of a chromatograph peak is primarily a function of the residual component retention by the support and the substrate, and the operating conditions in the separating column. For any one constituent the tail slope is essentially independent of concentration over fairly wide ranges. Since the actual voltage is always present on the RC delay network 48 before point 2 is reached, the curve remains valid with component concentration changes.

Since the curve is produced by passive components, repeatability is assured in automatic analyses.

The circuit of FIG. 6 is effective for deriving a signal component C separately despite appearance of the tail of signal B together with the actual signal peak C (shown shaded in FIG. 4). In FIG. 6, signal source 38" corresponding to unit 38 in FIG. 1 is connected to a switching device 52 to the moving contact 52a of the single-pole double-throw contacts shown. The normally closed contacts connect source 38" to decay network 54 including resistor 54a in series with capacitor 54b and shunted by resistor 54c having a return connection to source 38". The same signal is applied to a unity-gain amplifier 56 which preferably includes a series resistor 56a at its input, a negative feedback resistor 56b and an inverting chopper-stabilized direct current amplifier 56c, such as that in the article by E. A. Goldberg mentioned above. While the open-loop gain of amplifier 56c is high, the closed-loop gain of amplifier 56 is made to be unity by making resistors 56a and 56b equal. Condensers 56d and 56e shunt resistors 56a and 56b, and serve the same purposes as condensers 50i and 50j mentioned above.

Resistor 58 is interposed between the output of amplifier 56 and relay contacts 60 at the input of an integrator such as that in FIG. 1; and another resistor 62 is connected between normally open relay contact 52c and resistor 58. Resistors 58 and 62 are accurately matched, and they form a voltage divider whose extremities are energized with signals of opposite polarity, as will appear. The junction of resistors 58 and 62 is not loaded appreciably by the integrator. The series resistor at the input of the integrator is made much larger than the resistance of either of these resistors 58 and 62, ten times as large in an example.

When switching device 52 is operated to reverse the normal condition of its contacts, signal transmission from source 38 to decay network 54 is interrupted, but that network continues to provide a signal that simulates the tail of a preceding signal peak, starting at the signal level in effect at the time that signal transmission from source 38" was interrupted. This tail-simulating signal is transmitted and inverted by amplifier 56, and it is applied to resistor 58. With normally open contacts 52a, 52c closed, signal source 38" is connected to resistor 62. The signal from signal source 38" is combined in voltage divider 58, 62 with the tail-simulating signal generated by network 54 and inverted by amplifier 56. The resolved output at switch 60 is a separated signal C/2 in which the actual tail of signal B is canceled by the tail-simulating signal from network 54. Of course, the appearance of signal C/2 rather than signal C is taken into account by adjusting the gain elsewhere in the system accordingly.

In using the circuit of FIG. 6, the signal source 38" is connected to switching device 52 by closing switch 64 at point 4 (FIG. 4) shortly before the start of signal C, thereby charging the capacitor 54b in the decay network. (Switch 60 may be controlled to close at the same time.) Immediately afterward, at point 5, switching device 52 is operated to interrupt the connection of source 38" to network 54 and to connect the signal source 38" to input resistor 62. At this time the integrator is also set to zero. Thereafter, in any brief time interval before the start of signal C, the tail-simulating amplifier 56 is combined with the actual tail of signal B. The resolved signal is zero at the junction of resistors 58 and 62. Subsequently, when signal C on the tail of signal B is impressed on resistor 62, a signal C/2 is derived by the voltage divider and transmitted to the integrator. This transmisson continues for a time interval ending at point 6 in FIG. 4, and is then interrupted.

FIG. 7 illustrates a gas chromatograph together with an organized output system for separately utilizing the component signals in the time sequence of signal peaks produced by the chromatograph. FIG. 7 includes both of the circuits in FIGS. 5 and 6. Where the same parts are used, they bear the same reference numbers and their description is not repeated; and where the parts are similar, they bear primed reference numbers.

The chromatograph includes elements 10 to 36, previously described. Timer 66 provides relay-operating energization for all the relays present, including the timed switching devices mentioned in connection with FIGS. 5 and 6.

In FIG. 7, three main channels are shown, a first channel I for the simple, single-peak signals; a second channel II for signal peaks wherein the first of two overlapping signals is to be separated and utilized; and a third channel wherein the second of two overlapping signals is to be separated from the tail of the first. Between the chromatograph bridge and channels I, II and III there is a common range selector and amplifier unit 68. This includes an operational amplifier that provides stable D.C. gain, and switches to change the gain in steps, ordinarily by factors of 3, 10, 30, etc. The internal details of unit 68 are not needed for an understanding of the present invention, and are not shown. Any relays involved are operated when necessary by timer 66.

Channel I includes a main relay 70 whose contacts 70a connect unit 68 to integrator 72, of the same form as integrator 42 in FIG. 1. This integrator serves a series of separate memory units corresponding to respective constituents in the sample being analyzed. A typical memory unit 74 includes a main storage capacitor 74a, a much smaller auxiliary storage capacitor 74a', a relay 74b, buffer amplifier 74c and a local read-out 74d. Relay 74b is energized and capacitor 74a is connected to integrator 72 during the integration interval. Relay 74b is deenergized at the end of the integration interval and main capacitor 74a forces auxiliary capacitor 74a' to assume its charge potential, due to the considerably larger capacitance of capacitor 74a. Subsequently, while capacitor 74a is connected to the integrator, the stored charge in capacitor 74a' sustains the memory output.

Relay 76 provides a reset circuit between the input and output terminals of integrator 72, including current-limiting resistor 75. Relays 74b and 76 close just before the start of the signal to be integrated; but relay 76 remains closed momentarily, just long enough to reset the integrator.

Additional lines 78 (only two lines are shown, representing many) extend to other memory units via timer-controlled contacts, not shown. An output connection 80 extends from memory unit 74 to utilization apparatus, such as recorders, computers, and process-control apparatus.

At a time when a constituent of the sample is to emerge at sensing resistor 28, relay contacts 70a, 74b and 76 close. As soon as the integrator is set to zero, relay 76 is deenergized. The integrating operation starts, and capacitor 74a becomes charged to the rising voltage output of the integrator. The peak of the integrator output represents the integrated value of the signal-versus-time function of the particular output signal of the chromatograph that is involved. At the end of the signal, relays 70 and 74b are deenergized. The quantity of the related constituent in the sample is indicated on instrument 74d and is available for process control at output line 80. When integrator 72 is later used for another constituent, another memory unit 74 is selected by proper selection of another relay under control of master timer 66.

Channel II includes relay 82 having contacts 82a and 82b at the terminals of tail-simulating decay network 48. A different RC network 48 is connected between unit 68 and amplifier 50 by a corresponding relay 82 for each different tail-simulation curve required. For example, capacitor 48b may have different values of 25 to 50 microfarads, resistor 48a may be 100 ohms and resistor 48c may have various values up to a few megohms to match the tail of the particular constituent involved. This usually involves a time constant that may be anything from seconds to a few minutes.

At its output end, channel II includes an integrator 172, a series of memory units 174 and a series of timer-controlled relays 174b corresponding to units 72, 74 and 74b in channel I. While a separate integrator 172 is illustrated, it may be found feasible to utilize the same integrator 72 of channel I.

The operation of channel II will be fully understood from the discussion of FIG. 5, and is not repeated here.

Channel III incorporates a timer-controlled relay 64' having contacts 64a, 64b, 64c and 64d, for connecting appropriate tail-simulating networks into the circuit between signal supplying unit 68 and unity-gain inverting amplifier 56 and for making other appropriate connections. The range of values of the components used in network 54 may be the same as in network 48, and accordingly individual relays 64' and networks 54 are ordinarily used for each constituent to be monitored by channel III. Channel III includes an integrator 272, a series of memory units 274 and a corresponding series of timer-controlled relays 274b.

Separate integrators 172 and 272 are used. This is because channels II and III are operable concurrently when both signals of a pair of overlapping signals B and C are to be separated and individually utilized.

Channels II and III in the apparatus of FIG. 7 perform according to the same methods as was described in connection with FIGS. 5 and 6. However, channels II and III complement each other and combine in a system for utilizing the whole range of signals coming from the chromatograph, including both peaked components in the case of an overlapping pair of signals, where integrated single-signal functions are used for representing quantities of each constituent in a sample.

Operation of the system in FIG. 7 is demonstrated by idealized curves in FIG. 8, which represent, respectively, the output of unit 68 and the input to appropriate integrators 72, 172 or 272. In FIG. 8, a series of signals $a$ through $e$ are shown as provided by unit 68, representing signal amplitude versus time in minutes following sample injection. Signal $b$ has a tail $b-b$ overlapped by signal $c$, and the tail $d-d$ of signal $d$ overlaps signal $e$. The description is addressed to the utilization of signals $a$, $b$ and $e$ in channels I, II and III, these signals being shaded in FIG. 8. All five of the signals illustrated can be utilized by the same apparatus, as will become clear.

FIG. 8 shows certain of the signals $a'$, $b'$ and $e'$ after being conditioned by component resolving circuits in the case of overlapping signals. The required switching times $t-1$ through $t-9$ are determined, and the required gain controls are also established, on the basis of a preliminary spectrum run, after the analyzer has come to stable, repetitive sampling equilibrium.

At time $t-1$ the master timer 66 (FIG. 7) energizes relay 70, to connect the output of unit 68 to integrator 72, and timer 66 also energizes a selected memory-unit relay 74b and reset relay 76. Relay 76 remains energized for only a second, long enough to reset integrator 72 and discharge storage capacitor 74a. Then the integrating process starts, and continues until signal $a$ ends at time $t-2$. At this time relay 74b is deenergized and storage capacitor 74a is connected to auxiliary memory capacitor 74a' and establishes in the latter a voltage substantially equal to that of the peak output of the integrator.

At time $t-3$ the required range or gain selecting relay in unit 68 is energized by master timer 66. At this time selected relays 82 and 174b allocated to the component represented by signal $b$ are also energized, and the reset relay of the integrator 172 (corresponding to relay 76) is momentarily energized. Signal $b$ will be measured without interference until time $t-4$. At this time, timer 66 energizes relay 46 and disconnects the signal of unit 68 from the input end of channel II. After that moment, the simulated tail of signal $b$ is supplied by decay network 48, until time $t-5$ when the integration is halted as at time $t-2$. Between times $t-4$ and $t-5$, the signal peak $c$ appearing in the output of unit 68 is removed from all possible effect on the monitoring and measuring operation.

At time $t-6$ the appropriate range or gain-control switching takes place in unit 68 and selected relays 64 and 274b are energized, these relays being identified with the component represented by signal $e$. During the brief time interval that follows, the output of inverter amplifier 56 reaches integrator 272; but at time $t-7$, the internal integrator reset relay is energized momentarily and the resetting of the integrator also sets the junction of resistors 58 and 62 to zero. At time $t-7$ relay 52 is also energized, breaking the connection of unit 68 to decay circuit 54 and impressing on resistor 62 the composite signal output $d$ and $e$ of unit 68 (FIG. 8). That composite signal of unit 68 is reduced by the inverted signal $d-d$ from amplifier 56 which simulates the tail of signal $d$, in form and amplitude. A signal representing only peak $e$ is thus extracted, and transmitted to integrator 272. At time $t-8$ the relays 64', 52 and 274b are deenergized, and the integrated representation of signal $e$ is transferred to memory unit 274.

The system of FIG. 7 can be properly switched to utilize both signals $b$ and $c$ in channels II and III respectively, and both signals $d$ and $e$ can be utilized likewise. The overlapping signals have thus been effectively separated into their separate constituents. Both peak height and signal area are available; but as already stated, the integrated signal is here used for indicating and control purposes.

In FIGS. 5, 6 and 7, the decay networks 48 and 54 are essentially simple parallel R–C circuits of different values. These have been found excellent for tail simulation in the situation considered where a single column is used and where only one tail tends to interfere with the desired signal. In other situations, the decay network needed could well require a more complex circuit, and appropriately modified decay circuits are presently contemplated.

In the foregoing illustrative embodiments of the various aspects of the invention, the signal involved has been provided by a gas chromatograph. Other instruments are known that produce like forms of signals; and where this is true, the invention is directly applicable to signals of such other instruments. Moreover, various modifications in the methods and apparatus detailed above will occur to those skilled in the art, and various applications of the invention will be obvious. Consequently the invention should be construed broadly, in accordance with its full spirit and scope.

The embodiments of the invention in which an exclusive property or privilege is claimed are defined as follows:

1. The method of separating a first signal having a peak followed by a tail from a composite signal of the type provided by a gas chromatograph, consisting primarily of the first signal and a second signal overlapping said tail, said method including the steps of generating a signal simulating the tail of the first signal, and combining the portion of the composite signal that precedes the second signal with the tail-simulating signal occurring thereafter.

2. The method of separating a second signal from a composite signal of the type provided by a gas chromatograph consisting primarily of first and second signals, where the first signal has a peak followed by a tail that overlaps the second signal, said method including the steps of generating a signal simulating the tail of the first signal, and combining the composite signal and the generated signal in inverse relation to the composite signal from a time starting approximately at the appearance of the second signal.

3. The method of deriving the integral of a first signal of the type provided by a gas chromatograph, where the first signal represents a constituent of a sample being analyzed, and where the first signal has a tail that is overlapped by a second signal representing another constituent, which method includes the steps of integrating the composite signal and interrupting said integration approximately at the appearance of the second signal generating a signal simulating the tail of the first signal, and both integrating the tail-simulating signal from the time of said interruption and combining the integrated result with the integrated result of the interrupted composite signal.

4. The method of deriving the integral of a second signal of the type provided by a gas chromatograph where the second signal represents a constituent in the sample being analyzed and where the second signal overlaps the tail of an earlier signal representing another constituent, which method includes the steps of generating a signal representing the tail of the first signal, and integrating the composite signal and the inverse of the tail-representing signal from a time starting approximately at the start of the second signal.

5. The method of measuring the quantity of a constituent in a sample being analyzed in a chromatographic analyzer where that constituent is represented by a first peak and a following tail in a composite signal also having a second signal overlapping the tail of the first, said method including the steps of first integrating the composite signal approximately until the start of the second signal and thereupon interrupting the integration thereof, generating a tail-simulating signal whose initial value equals the instantaneous value of the composite signal at the time of said interruption, and both integrating the tail-simultaing signal and adding the integrated result to the integrated result of the interrupted composite signal.

6. The method of measuring the quantity of a particular constituent in a sample being analyzed in a chromatographic analyzer where that constituent is represented by a second signal in a composite signal from the chromatographic analyzer and in which the second signal is overlapped by the tail of a first signal, said method including the steps of generating an inverted signal simulating the tail of the first signal, and combining and integrating said tail-simulating signal and the composite signal as a measure of the particular constituent.

7. Apparatus for separating a first signal from a pair of overlapping signals of the type produced by a gas chromatograph representing two constituents of a sample being analyzed, said apparatus including means for supplying a composite signal comprising a pair of peaked signals having tails where the tail of the first signal is overlapped by the second signal, signal receiving means, means for generating a signal simulating the tail of the first signal, and switching means for initially connecting the signal supplying means to the signal receiving means and to the signal generating means, said switching means being operable approximately at the start of the second signal for thereafter applying only the tail-simulating signal from said generating means to the signal receiving means.

8. Apparatus for separating the second signal from a pair of overlapping signals of the type provided by a gas chromatograph, each signal representing a constituent of the sample being analyzed, said apparatus including means for supplying a composite signal comprising a close-spaced pair of peaked signals having tails where the second signal is overlapped by the tail of the first signal, signal receiving means, means for generating a signal simulating the tail of the first signal, switching means operable initially for establishing a coordinating connection from said signal supplying means to said signal generating means and operable approximately at the start of the second signal for establishing a connection from said composite signal supplying means to said signal receiving means, and means coupling the tail-simulating signal from said signal generating means inversely to said signal receiving means.

9. Apparatus for separating a first signal from a pair of overlapping signals of the type produced by a gas chromatograph representing two constituents of a sample being analyzed, said apparatus including means for supplying a composite signal comprising a pair of peaked signals having tails where the tail of the first signal is overlapped by the second signal, signal receiving means, means including a resistance-capacitance decay network for developing a signal simulating the tail of the first signal in respect to magnitude, timing and form, and switching means operable initially for transmitting the signal from said signal supplying means both to said signal receiving means and to said decay network, said switching means being operable approximately at the start of said second signal for interrupting the transmission from the signal supplying means, said apparatus including means for thereafter providing a connection from the decay network to the signal receiving means.

10. Apparatus for separating the second signal from a pair of overlapping signals of the type provided by a gas chromatograph, each signal representing a constituent of the sample being analyzed, said apparatus including means for supplying a composite signal comprising a close-spaced pair of peaked signals having tails where the second signal is overlapped by the tail of the first signal, signal receiving means, means including a resistance-capacitance decay network for developing a signal simulating the tail of the first signal in respect to magnitude, timing and form, and switching means operable initially for transmitting the signal from said signal supplying means to said decay network, said switching means being operable approximately at the start of said second signal for interrupting said transmission and for concurrently coupling said composite signal supplying means to said signal receiving means, said apparatus including means effective for coupling the signal from said decay network inversely to said signal receiving means.

11. Apparatus for separating a desired signal from an overlapping pair of signals of the type produced by a gas chromatograph where each signal represents a constituent of a sample being analyzed, said apparatus including means for supplying a composite signal including a first peaked signal having a tail overlapped by a second peaked signal, a decay network for developing a signal simulating the tail of the first signal, and switching means for providing a coupling from said signal supplying means to said decay network, said switching means being operable approximately at the start of said second signal for interrupting said coupling and thereby to mark a separation of the composite signal into first and second portions, said apparatus further including means for combining said tail-simulating signal and one of said portions of the composite signal so as to yield the desired signal.

12. Apparatus for simultaneously deriving two signals from a detector where the signals represent separate constituents in a sample being analyzed and where the constituents produce close-spaced peaked signals the first of which has a tail that overlaps the second, said apparatus including a source of such signals, a first channel having first tail-simulating signalling means and a first signal receiver both having input connections from said signal source and said connections including first switching means operable to initiate signal transmission to said first signal receiver approximately at the start of the first signal and to interrupt the supply of signals to said first signal receiver from said source approximately at the start of the second signal, said tail-simulating signaling means also having coupling means to said first signal receiver that becomes effective after interruption of signals from said source to apply a tail-simulating signal to said first signal receiver, thereby to apply a derived signal to said first signal receiver comprising the initial portion of the first signal followed immediately by a tail-simulating signal, said apparatus including a second channel having tail-simulating signalling means including signal inverting means, a second signal receiver, and second switching means first operable prior to the start of the second signal to connect the signal source to the tail-simulating and inverting means and being operable approximately at the start of the second signal to connect the signal source to the second signal receiver, said second signal receiver including input network means for combining the inverted tail-simulating signal and the composite signal including the second signal overlapped by the tail of the first signal so as to resolve the combined signals into the second signal stripped of the tail of the first signal.

13. Apparatus for simultaneously deriving two signals from a detector where the signals represent separate constituents in a sample being analyzed and where the constituents produce close-spaced peaked signals the first of which has a tail that overlaps the second, said apparatus including a source of such signals, a first channel having a first passive decay network for developing a tail-simulating signal and a first signal receiver both having input connections from said signal source and said connections including first timer-operated switching means to initiate signal transmission just prior to the first signal and to interrupt the supply of signals from said source to said first signal receiver just prior to the start of the second signal, said tail-simulating signal network also having coupling means to said first signal receiver that becomes effective after interruption of signals from said source to apply a tail-simulating signal to said first signal receiver, thereby to apply a derived signal to said receiver comprising the initial portion of the first signal followed immediately by a tail-simulating signal, said apparatus including a second channel having a second passive decay network for developing a tail-simulating signal, a second signal receiver, and second timer-operated switching means first operable prior to the start of the second signal to connect the signal source to the second passive decay network and being operable approximately at the start of said second signal to disconnect the signal source from the decay network and to connect the signal source to the second signal receiver, said second signal receiver including input coupling means for inverting the tail-simulating signal from the second passive network and combining the inverted tail-simulating signal with the composite signal including the second signal overlapped by the tail of the first signal so as to resolve the thus combined signals into the second signal stripped of the tail of the first signal.

14. Apparatus for deriving quantitative measurement of two separate constituents in a sample being analyzed, where the constituents are represented by two peaked signals the first of which has a tail that overlaps the second, said apparatus including a source of such signals, a first channel having first tail-simulating signalling means and a first inetgrator both having input connections from said signal source and said connections including first switching means operable to initiate signal transmission from said source to said first integrator just prior to the first signal and to interrupt the supply of signals from said source to said first integrator approximately at the start of the second signal, said tail-simulating signalling means also having coupling means to said first integrator that becomes effective after interruption of signals from said source to apply a tail-simulating signal to said integrator, thereby to provide a quantitative representation of a first constituent of the sample, said apparatus including a second channel having second tail-simulating signalling means, a second integrator, and second switching means initially operable shortly before the start of the second signal to connect the signal source to the second tail-simulating means and being operable approximately at the start of the second signal to disconnect said signal source therefrom and to connect the signal source to the second integrator, said second integrator including an input network having means for inverting the tail-simulating signal and for combining the inverted tail-simulating signal and the composite signal that includes the second signal overlapped by the tail of the first signal so as to provide a quantitative representation of the second constituent of the sample.

15. Apparatus in accordance with claim 14, wherein each of said tail-simulating means is a passive resistance-capacitive network and wherein said inverting means is a unity-gain isolating amplifier.

16. A process chromatograph, including a column having means for admission of a carrier gas and a sample to be analyzed, a detector having means for comparing the effluent from the column with a reference stream of carrier gas, said detector having means for emitting an electrical signal that varies with time and includes a series of signal peaks corresponding to the constituents in the sample, and automatic means for converting said signal peaks into signals representing the concentrations of the constituents in the sample, said converting means including a first capacitor, an integrator for charging said first capacitor to a potential representing the integral of a signal peak, a series of memory units each having a respective second capacitor, a timer, and timer-controlled switching means operable in a sequence of cycles for setting said integrator and said first capacitor to zero just prior to the rise of each signal peak, then releasing said integrator to charge said first capacitor to a peak representing the concentration of particular constituents in the sample, and then connecting said first capacitor successively to the second capacitors of successive ones of said memory units which are identified with said particular constituents.

17. A process chromatograph, including a column having means for admission of a carrier gas and a sample to be analyzed, a detector having means for comparing the effluent from the column with a reference stream of carrier gas, said detector having means for emitting an electrical signal that varies with time and includes a series of signals corresponding to the constituents in the sample, and automatic means for converting said signals into signals representing the concentrations of the constituents in the sample, said converting means including an integrator, a series of memory units each having a storage capacitor, and a timer, said timer being operable in a series of cycles corresponding to the constituents of the sample and including means for causing said integrator to be set to zero just before each signal, and being operable in successive cycles for casuing the storage capacitors of said memory units individually to assume a charge corresponding to the output of the integrator at the practical end-points of said signals.

18. A process chromatograph in accordance with claim 17, including plural integrators each having plural related memory units as aforesaid, and including means interposed between said detector and one of said integrators and including a tail-simulating signal generator for deriving a desired signal including its peak and its tail from a composite signal that includes the desired signal and another signal that overlaps said tail, and further including means interposed between said detector and another of said integrators and including another tail-simulating signal generator for deriving a further desired signal from a composite signal that includes both the further desired signal and the tail of a preceding signal that overlaps said further desired signal.

19. A process chromatograph including a column having means for admission of a carrier gas and a sample to be analyzed, a detector having means for comparing the effluent from the column with a reference stream of carrier gas, said detector having means for emitting an electrical signal that varies with time and includes a series of signals corresponding to the constituents in the sample, each of said series of signals having a peak and a tail, and automatic means for converting said signals into signals representing the concentrations of the constituents in the sample, said converting means including an integrator having output means for indicating the concentration of a constituent of the sample, and means interposed between said detector and said integrator and including a tail-simulating signal generator for deriving a desired signal including its peak and its tail from a composite signal that includes the desired signal and another signal that overlaps the tail of the desired signal.

20. A process chromatograph including a column having means for admission of a carrier gas and a sample to be analyzed, a detector having means for comparing the effluent from the column with a reference stream of carrier gas, said detector having means for emitting an electrical signal that varies with time and includes a series of signals corresponding to the constituents in the sample, each of said series of signals having a peak and a tail, and automatic means for converting said series of signals into signals representing the concentrations of the constituents in the sample, said converting means including an integrator having output means for indicating the concentration of a constituent of the sample, and means intersposed between said detector and said integrator and including a tail-simulating signal generator for deriving a desired signal from a composite signal that concurrently includes both the desired signal and the tail of a preceding signal that overlaps the desired signal.

21. The method of deriving the integral of a first signal having a peak followed by a tail where the first signal occurs as part of a composite signal of the type provided by a chromatographic analyzer, the composite signal also including a second signal overlapping said tail, including the steps of generating a signal simulating the tail of the first signal from a time starting with the appearance of the second signal, integrating the first signal until the appearance of the second signal and thereafter integrating said tail-simulating signal and adding the result to the integrated portion of the first signal.

22. The method of deriving the integral of a second signal occurring in a composite signal of the type provided by a chromatographic analyzer, the composite signal including a first signal having a peak followed by a tail and a second signal overlapping said tail, which method includes the steps of generating a signal simulating said tail, and combining and integrating said composite signal and that part of the tail-simulating signal which is overlapped by the second signal as a measure of the second signal.

23. Apparatus for separating a first signal from a composite signal of the type provided by a chromatographic analyzer, the composite signal comprising a first signal having a peak followed by a tail and a second signal overlapping said tail, said apparatus comprising means for supplying said composite signal, signal receiving means, means coupled to said composite signal supplying means for generating a signal simulating the tail of said first signal, and control means for applying the signal from said composite signal supplying means to said receiving means until the appearance of said second signal and for thereafter applying only the signal from said tail-simulating signal generating means to said signal-receiving means.

24. Apparatus for separating a desired signal from a composite signal of the type provided by a chromatographic analyzer, the composite signal including a first signal having a peak followed by a tail overlapped by said desired signal, said apparatus including means for supplying said composite signal, means excited by said composite signal-supplying means before the appearance of said desired signal for generating a signal simulating said tail, and means coupled to said tail-simulating signal generating means and to said composite signal-supplying means for combining the tail-simulating signal negatively with said composite signal approximately from the start of said desired signal, for deriving the desired signal.

25. Apparatus for determining the quantity of a particular constituent in a sample tested in a chromatographic analyzer, wherein a detector yields a composite signal that includes a first signal having a peak followed by a tail and a second signal overlapping said tail, and where said constituent is represented by one of said first and said second signals, said apparatus including means including said detector for supplying said composite signal, a signal-responsive decay device having a decay characteristic simulating the form of the tail of the first signal, means for applying to said decay device the composite signal from said signal supplying means after the peak of the first signal but before the appearance of said second signal, and means for deriving a representation of the quantity of said particular constituent in the sample, said last-named means having signal input coupling from said decay device for the duration of said second signal and said last-named means also having signal input coupling from said composite signal supplying means for at least part of the duration of the composite signal.

26. Apparatus in accordance with claim 25 including timing means for limiting the supply of said composite signal to said measurement deriving means to include all of said first signal until the appearance of said second signal.

27. Apparatus in accordance with claim 25 including timing means for limiting the supply of said composite signal to said measurement deriving means to the duration of said second signal.

28. Apparatus for determining the quantity of a particular constituent in a sample tested in a chromatographic analyzer, wherein a detector yields a composite signal that includes a first signal having a peak followed by a tail and a second signal overlapping said tail, and where said constituent is represented by one of said first and said second signals, said apparatus including means including said detector for supplying said composite signal, means including said detector for supplying said composite signal, and means responsive to said signal supplying means for deriving a measurement of said particular constituent, said last-named means including a decay device for providing a signal simulating said tail, said decay device having a decay characteristic simulating the form of the tail of said first signal and said decay device having input signal coupling from said signal supplying means at a time following the peak of the first signal and before the appearance of the second signal.

References Cited

UNITED STATES PATENTS

| 3,049,908 | 8/1962 | Kindred et al. | 73—23.1 |
| 3,177,138 | 4/1965 | Larrison | 73—23.1 X |
| 3,230,358 | 1/1966 | Davis et al. | 253—183 |
| 3,257,847 | 6/1966 | Levy et al. | 73—23.1 |
| 3,316,751 | 5/1967 | Burk | 73—23.1 |

FOREIGN PATENTS

| 939,686 | 10/1963 | Great Britain. |

RICHARD C. QUEISSER, *Primary Examiner.*

JAMES J. GILL, *Examiner.*

C. A. RUEHL, *Assistant Examiner.*